(12) United States Patent
Hurd

(10) Patent No.: US 6,442,701 B1
(45) Date of Patent: Aug. 27, 2002

(54) POWER SAVING BY DISABLING MEMORY BLOCK ACCESS FOR ALIGNED NOP SLOTS DURING FETCH OF MULTIPLE INSTRUCTION WORDS

(75) Inventor: Linda L. Hurd, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/415,526

(22) Filed: Oct. 8, 1999

Related U.S. Application Data

(60) Provisional application No. 60/109,839, filed on Nov. 25, 1998.

(51) Int. Cl.⁷ .................................................. G06F 1/32
(52) U.S. Cl. ........................ 713/324; 712/24; 712/204; 713/300; 717/141
(58) Field of Search ................. 713/320, 324; 712/24, 204; 717/141

(56) References Cited

U.S. PATENT DOCUMENTS

| | | | |
|---|---|---|---|
| 5,495,617 A | | 2/1996 | Yamada ........................ 713/323 |
| 5,557,557 A | | 9/1996 | Frantz et al. .................. 703/22 |
| 5,584,031 A | | 12/1996 | Burch et al. ................. 713/323 |
| 5,787,302 A | * | 7/1998 | Hampapuram et al. ..... 712/203 |
| 5,790,877 A | * | 8/1998 | Nishiyama et al. ......... 713/320 |

* cited by examiner

Primary Examiner—Kenneth S. Kim
(74) Attorney, Agent, or Firm—Robert D. Marshall, Jr.; W. James Brady, III; Frederick J. Telecky, Jr.

(57) ABSTRACT

A method of optimizing assembly code of a VLIW processor (10) or other processor that uses multiple-instruction words (20), each of which comprise instructions to be executed on different functional units (11d and 11e) of the processor (10). The instruction words (20) are modified, such that NOPs instructions are aligned in the same slot from one instruction to the next for a series of instructions. This modification permits memory access to be disabled so that those instructions are not fetched.

16 Claims, 5 Drawing Sheets

FIG. 3

| PARALLEL DESIGNATOR (P-BIT) | CONDITIONAL REGISTER FIELD | INSTRUCTION TYPE | FUNCTIONAL UNIT | OPERAND FIELD |
|---|---|---|---|---|
|  | [A2] | ADD | .L1 | A9, A10, A10 |
| \|\| |  | ADD | .L2 | B12, B11, B12 |
| \|\| |  | MPYHL | .M1 | A8, A5, A9 |
| \|\| |  | MPYH | .M2X | A8, B6, B7 |
| \|\| |  | LDW | .D1 | *A0++[2], A5 |
| \|\| |  | LDW | .D2 | *B3++[2], B6 |
| \|\| | [B2] | ADD | .S1 | A2, 1, A2 |
| \|\| |  | NOP |  |  |

OPFIELD spans INSTRUCTION TYPE and FUNCTIONAL UNIT (20)

FIG. 4A

| .L Unit | .M Unit | .S Unit | .D Unit |
|---|---|---|---|
| ABS | MPY | ADD | ADD |
| ADD | SMPY | ADDK | ADDA |
| AND |  | ADD2 | LD mem |
| CMPEQ |  | AND |  |
| CMPGT |  | B disp | MV |
| CMPGTU |  | B IRP | NEG |
| CMPLT |  | B NRP | ST mem |
| CMPLTU |  | B reg |  |
| LMBD |  | CLR | SUB |
| MV |  | EXT | SUBA |
| NEG |  | EXTU | ZERO |
| NORM |  | MVC |  |
| NOT |  | MV |  |
| OR |  | MVK |  |
| SADD |  | MVKH |  |
| SAT |  | NEG |  |
| SSUB |  | NOT |  |
| SUB |  | OR |  |
| SUBC |  | SET |  |
| XOR |  | SHL |  |
| ZERO |  | SHR |  |
|  |  | SHRU |  |
|  |  | SSHL |  |
|  |  | SUB |  |
|  |  | SUB2 |  |
|  |  | XOR |  |
|  |  | ZERO |  |

FIG. 4B

| ARITHMETIC | MULTIPLY | LOAD/STORE | PROGRAM CONTROL |
|---|---|---|---|
| ABS | MPY | LD | B |
|   absolute value | MPYH |   load | BIRP |
| ADD | MPYHL | MVK | BNRP |
| ADDA | MPYLH | MVKH |   branch |
| ADDK | SMPY |   move | |
| ADD2 |   multiply | ST | |
| SADD | |   store | |
|   addition | | | |
| SAT | | | |
|   saturate | | | |
| SSUB | | | |
| SUB | | | |
| SUBA | | | |
| SUBC | | | |
| SUBB | | | |
|   subtraction | | | |

| BIT MANAGEMENT | LOGICAL | PSEUDO/OTHER |
|---|---|---|
| CLR | AND | IDLE |
|   clear | CMPEQ | MV |
| EXT | CMPBT | MVC |
|   extract | CMPLT |   move |
| LMBD |   compare | NOP |
|   leftmost bit detection | OR | ZERO |
| NORM | SHL | NEG |
|   normalize | SHR | NOT |
| SET |   shift | |
| | SSHL | |
| |   shift w/ saturation | |
| | XOR | |

|         | CMPGT | .L1  | A4, 0, A1       | } EP1 |           |
|---------|-------|------|-----------------|-------|-----------|
| \|\|    | MVK   | .S1  | 32767, A0       |       |           |
| [A1]    | NORM  | .L1  | A4, A3          |       |           |
| \|\| [A1] | MVK | .S2  | _table, B1      | } EP2 |           |
| \|\|    | MVK   | .S1  | 1, A2           |       | } 20 (FP1) |
| [A1]    | AND   | .L1  | A3, 1, A2       |       |           |
| \|\| [A1] | SSHL | .S1 | A4, A3, A4      | } EP3 |           |
| \|\| [A1] | MVKH | .S2 | _table, B1      |       |           |
| [A1]    | SHR   | .S2X | A4, 16, B0      | } EP1 |           |
| \|\| [A1] | SHR | .S1  | A4, 1, A4       |       |           |
| [A1]    | EXT   | .S1  | A4, 16, 16, A4  | } EP2 |           |
| \|\| [A1] | SUB | .S2  | B0, 16, B0      |       | } 20 (FP2) |
|         | AND   | .L1  | A4, A0, A4      | } EP3 |           |
| \|\|    | ADDAH | .D2  | B1, B0, B1      |       |           |
| [A1]    | LDH   | .D2  | *B1++, B0       | } EP4 |           |
| \|\| [A1] | MVK | .S1  | B0, A2          |       |           |

|     | SLOT 1 | SLOT 2 | SLOT 3 | SLOT 4 | SLOT 5 | SLOT 6 | SLOT 7 | SLOT 8 |
|-----|--------|--------|--------|--------|--------|--------|--------|--------|
| FP1 | ////// | ////// | ////// | ////// | ////// | ////// | NOP    | NOP    |
| FP2 | ////// | ////// | ////// | ////// | NOP    | NOP    | NOP    | NOP    |
| FP3 | ////// | ////// | ////// | ////// | ////// | ////// | ////// | ////// |
| FP4 | ////// | ////// | ////// | ////// | ////// | ////// | NOP    | NOP    |
| FP5 | ////// | ////// | ////// | ////// | ////// | ////// | ////// | NOP    |
| FP6 | ////// | ////// | ////// | ////// | ////// | ////// | NOP    | NOP    |
| FP7 | ////// | ////// | ////// | ////// | NOP    | NOP    | NOP    | NOP    |
| FP8 | ////// | ////// | ////// | ////// | ////// | ////// | ////// | ////// |

FIG. 6B

|     | SLOT 1 | SLOT 2 | SLOT 3 | SLOT 4 | SLOT 5 | SLOT 6 | SLOT 7 | SLOT 8 |
|-----|--------|--------|--------|--------|--------|--------|--------|--------|
| FP1 | ////// | ////// | ////// | ////// | ////// | ////// | NOP    | NOP    |
| FP2 | ////// | ////// | ////// | ////// | ////// | ////// | NOP    | NOP    |
| FP3 | ////// | ////// | ////// | ////// | ////// | ////// | ////// | NOP    |
| FP4 | ////// | ////// | ////// | ////// | ////// | ////// | NOP    | NOP    |
| FP5 | ////// | ////// | ////// | ////// | ////// | ////// | NOP    | NOP    |
| FP6 | ////// | ////// | ////// | ////// | ////// | ////// | ////// | NOP    |
| FP7 | ////// | ////// | ////// | ////// | ////// | ////// | NOP    | NOP    |
| FP8 | ////// | ////// | ////// | ////// | ////// | ////// | NOP    | NOP    |

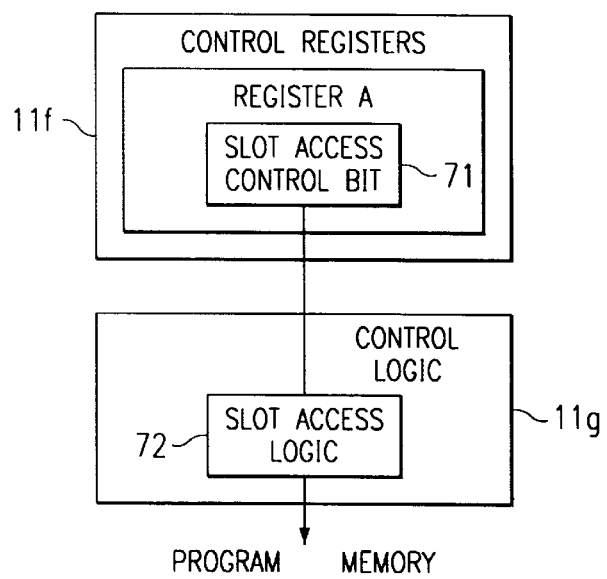

FIG. 7

POWER SAVING BY DISABLING MEMORY BLOCK ACCESS FOR ALIGNED NOP SLOTS DURING FETCH OF MULTIPLE INSTRUCTION WORDS

This application claims priority under 35 USC §119(e)(1) of Provisional Application No. 60/109,839, filed Nov. 25, 1998.

TECHNICAL FIELD OF THE INVENTION

This invention relates to microprocessors, and more particularly to methods of using programming instructions in a manner that reduces the power dissipation of a processor.

BACKGROUND OF THE INVENTION

Power efficiency for processor-based equipment is becoming increasingly important as people are becoming more attuned to energy conservation issues. Specific considerations are the reduction of thermal effects and operating costs. Also, apart from energy conservation, power efficiency is a concern for battery-operated processor-based equipment, where it is desired to minimize battery size so that the equipment can be made small and lightweight. The "processor-based equipment" can be either equipment designed especially for general computing or equipment having an embedded processor.

From the standpoint of processor design, a number of techniques have been used to reduce power usage. These techniques can be grouped as two basic strategies. First, the processor's circuitry can be designed to use less power. Second, the processor can be designed in a manner that permits power usage to be managed.

On the other hand, given a particular processor design, its programming can be optimized for reduced power dissipation. Thus, from a programmer's standpoint, there is often more than one way to program a processor to perform the same function. For example, algorithms written in high level programming languages can be optimized for efficiency in terms of time and power. Until recently, at the assembly language level, most optimization techniques have been primarily focussed on speed of execution without particular regard to power use.

The programmer's task of providing power efficient code can be performed manually or with the aid of an automated code analysis tool. Such a tool might analyze a given program so to provide the programmer with information about its power usage information. Other such tools might actually assist the programmer in generating optimized code.

U.S. Pat. No. 5,557,557, to Franz, et al., entitled "Processor Power Profiler", assigned to Texas Instruments Incorporated, describes a method of modeling power usage during program execution. A power profiler program analyzes the program and provides the programmer with information about energy consumption. A power profiler is also described in U.S. patent application Ser. No. 06/046,811, to L. Hurd, entitled "Module-Configurable, Full-Chip Power Profiler", assigned to Texas Instruments Incorporated.

Once the power requirements of a particular program are understood, the code can be optimized. Automating this aspect of programming requires a code generation tool that can restructure computer code, internal algorithms as well as supporting functions, for minimum power usage.

SUMMARY OF THE INVENTION

One aspect of the invention is a method of optimizing computer programs for power usage. The method is useful for various types of processors that execute "multiple-instruction words" (as defined herein). Examples of such processors are VLIW (very long instruction word) processors and dual datapath processors.

Multiple-instruction words are characterized by having "slots", each word having a different slot for each instruction. Thus, slot 1 contains the first instruction of each word, slot 2 the second, etc. Typically, each word is executed in its own processor cycle, but this is not necessarily the case.

For a particular listing of program code, the syntax of any series of two or more words is compared. It is determined whether, from word to word, one or more NOP instructions can be moved to the same slot without substantially affecting functionality of the program code. If not, the words are modified by moving the NOP instructions to the same slot and making any other modifications necessary to maintain the same functionality. As a result, the NOP instructions are aligned in the same slot. The code is further modified such that during fetch cycles for these aligned instructions, access to memory storing them may be disabled.

Thus, optimization is achieved at the processor architecture level, rather than to high level programming. This permits a processor to be programmed in a manner that is most efficient for that processor. The method can be easily adapted to the characteristics of the processor and its instruction set.

BRIEF DESCRIPTION OF THE DRAWINGS

FIG. 3 illustrates an example of the fetch packet of FIG. 2.

FIG. 4A illustrates the mapping of the instruction types for the processor of FIG. 1 to the functional units in its datapaths.

FIG. 4B is a table describing the mnemonics of FIG. 4A.

FIG. 5 illustrates a fetch packet having multiple execute packets.

FIGS. 6A and 6B illustrate unoptimized and optimized code respectively.

FIG. 7 illustrates a slot access control bit and associated logic, which are part of the processor of FIG. 1.

DETAILED DESCRIPTION OF THE INVENTION

The invention described herein is directed to power management for microprocessors. An underlying principle of operation is that the programming provided to the processor can be optimized so as to reduce power usage. Given a particular instruction set, a program using these instructions can be analyzed to detect the presence of non-optimal instruction sequences. These sequences can be modified so that power usage is more efficient, without adversely affecting code functionality.

The method of the invention is most useful with VLIW (very long instruction word) processors, which are characterized by their ability to execute multiple instructions in parallel using different functional units within the processor. The invention is also useful with "dual datapath" processors, which execute two instructions in parallel on two datapaths. Both types of processors execute "multiple-instruction words" in parallel in more than one functional unit. However, parallelism is not a limitation of the invention, and any processor that fetches and decodes more than one instruction at a time will benefit from the optimization process. As explained below, for such processors, cycle-to-cycle instruction fetching, dispatching, and decoding can be optimized for power if the code is arranged properly.

In light of the preceding paragraph, the term "processor" as used herein may include various types of micro controllers and digital signal processors (DSPs). To this end, the following description is in terms of DSPs—the TMS320 family of DSPs and the TMS320C6x DSP in particular. However, this selection of a particular processor is for purposes of description and example only.

Processor Overview

Figure 1:
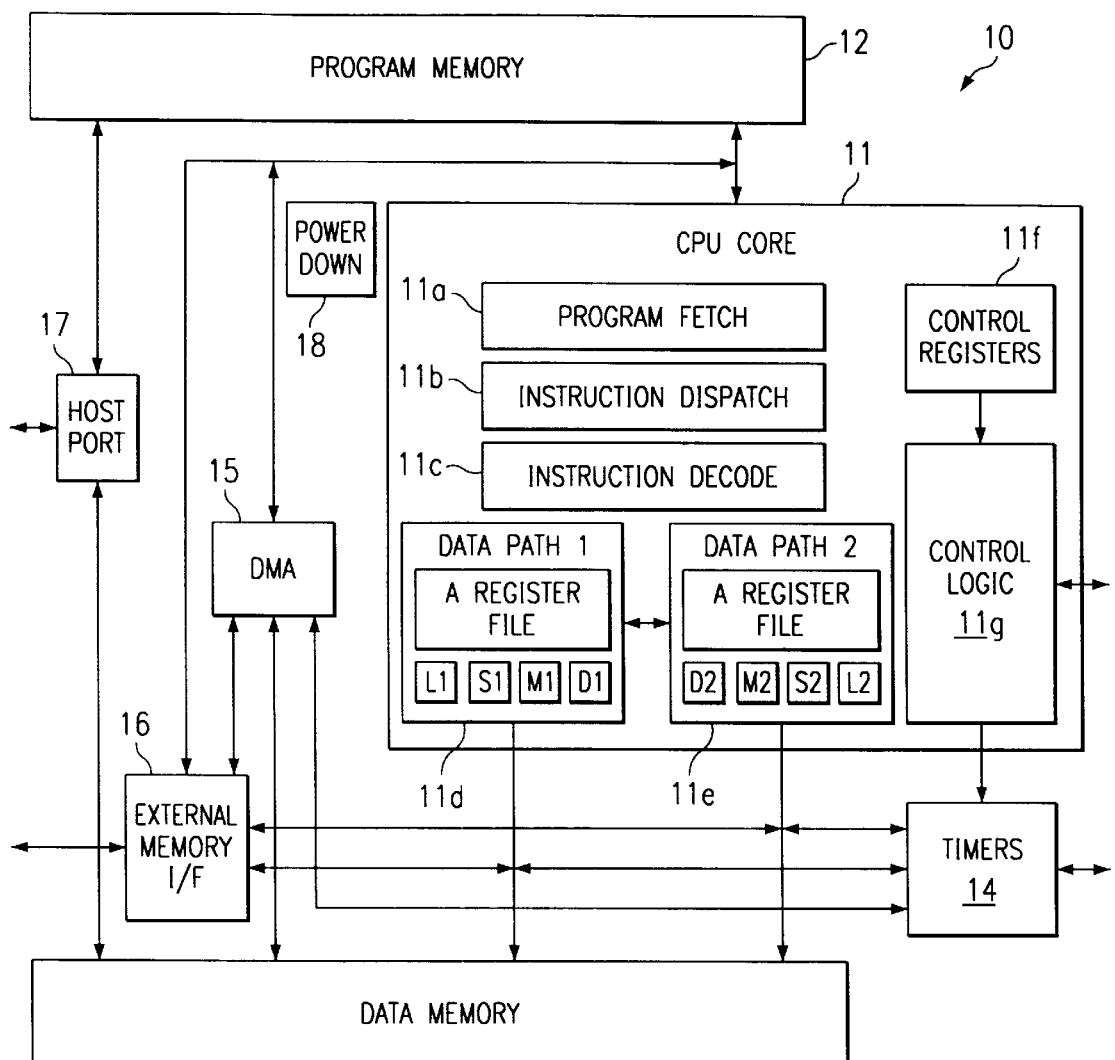
FIG. 1 is a block diagram of a VLIW DSP processor.

FIG. 1 is a block diagram of a DSP processor 10. As explained below, processor 10 has a VLIW architecture, and fetches multiple-instruction words (as "fetch packets") to be executed in parallel (as "execute packets") during a single CPU clock cycle. In the example of this description, processor 10 operates at a 5 nanosecond CPU cycle time and executes up to eight instructions every cycle.

Processor 10 has a CPU core 11, which has a program fetch unit 11a, and instruction dispatch and decode units 11b and 11c, respectively. To execute the decoded instructions, processor 10 has two datapaths 11d and 11e.

Instruction decode unit 11c delivers execute packets having up to eight instructions to the datapath units 11d and 11e every clock cycle. Datapaths 11d and 11e each include 16 general-purpose registers. Datapaths 11d and 11e each also include four functional units (L, S, M, and D), which are connected to the general-purpose registers. Thus, processor 10 has eight functional units, each of which may execute one of the instructions in an execute packet. Each functional unit has a set of instruction types that it is capable of executing.

The control registers 11f provide the means to configure and control various processor operations. The control logic unit 11g has logic for control, test, emulation, and interrupt functions.

Processor 10 also comprises program memory 12, data memory 13, and timer 14. Its peripheral circuitry includes a direct memory access (DMA) controller 15, external memory interface 16, host port 17, and power down logic 18. The power down logic 18 can halt CPU activity, peripheral activity, and timer activity to reduce power dissipation. These power down modes, as well as features of processor 10 other than the features of the present invention, are described in U.S. patent application Ser. No. 60/046,811, referenced in the Background and incorporated herein by reference.

Processor 10 executes RISC-like code, and has an assembly language instruction set. In other words, each of its VLIWs comprises RISC-type instructions. A program written with these instructions is converted to machine code by an assembler. Processor 10 does not use microcode or an internal microcode interpreter, as do some other processors. However, the invention described herein could be applicable regardless of whether RISC-like instructions control the processor or whether instructions are internally interpreted to a lower level.

In the example of this description, eight 32-bit instructions are combined to make the VLIW. Thus, in operation, 32-bit instructions are fetched eight at a time from program memory 12, to make a 256-bit instruction word. The "fetch packet" is comprised of these eight instructions fetched from memory 12.

Figure 2:
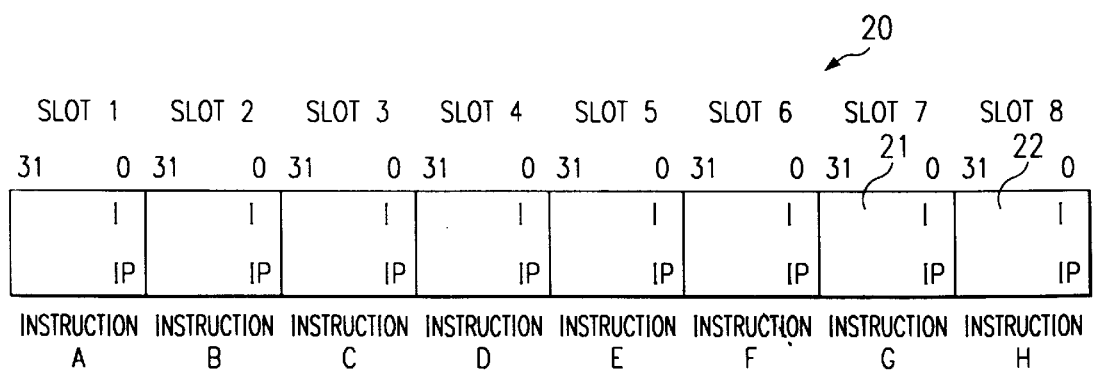
FIG. 2 illustrates the basic format of a fetch packet used by the processor of FIG. 1.

FIG. 2 illustrates the basic format of the fetch packet 20 used by processor 10. Each of the eight instructions in fetch packet 20 is placed in a location referred to as a "slot" 21. Thus, fetch packet 20 has Slots 1, 2, . . . 8.

Processor 10 differs from other VLIW processors in that the entire fetch packet is not necessarily executed in one CPU cycle. All or part of a fetch packet is executed as an "execute packet". In other words, a fetch packet can be fully parallel, fully serial, or partially serial. In the case of a fully or partially serial fetch packet, where the fetch packet's instructions require more than one cycle to execute, the next fetch can be postponed. This distinction between fetch packets and execute packets permits every fetch packet to contain eight instructions, without regard to whether they are all to be executed in parallel.

For processor 10, the execution grouping of a fetch packet 20 is specified by a "p-bit" 22 in each instruction. In operation, instruction dispatch unit 11b scans the p-bits, and the state of the p-bit of each instruction determines whether the next instruction will be executed in parallel with that instruction. If so, its places the two instructions are in the same execute packet to be executed in the same cycle.

FIG. 3 illustrates an example of a fetch packet 20. Whereas FIG. 2 illustrates the format for the fetch packet 20, FIG. 3 illustrates an example of instructions that a fetch packet 20 might contain. A fetch packet 20 typically has five to eight instructions, and the fetch packet 20 of FIG. 3 has seven. Each instruction has a number of fields, which ultimately are expressed in bit-level machine code.

The | | characters signify that an instruction is to execute in parallel with the previous instruction, and is coded as p-bit 22. As indicated, fetch packet 20 is fully parallel, and may be executed as a single execute packet.

The square brackets [ ] signify a conditional instruction, surrounding the identifier of a condition register. Thus, the first instruction in FIG. 3 is conditioned on register A2 being nonzero. A ! character signifies "not", so that a condition on A2 being zero would be expressed as [!A2]. The conditional register field comprises these identifiers.

The opfield contains an instruction type from the instruction set of processor 10. Following the instruction type is the designation of the functional unit that will execute the instruction. As stated above in connection with FIG. 1, each of the two datapaths 11d and 11e has four functional units. These functional units are L (logical), S (shift), M (multiply), and D (data). The opfield thus has the syntax [instruction type]·[functional unit identifier].

Some instruction types can be performed by only one functional unit and some can be performed by one of a number of them. For example, only the M unit can perform a multiply (MPY). On the other hand, an add (ADD) can be performed by the L, S, or D unit. The correspondence of functional units to instructions is referred to herein as their "mapping".

FIG. 4A is a table illustrating, for processor 10, the mapping of instruction types to functional units. It is useful for an understanding of the examples set out below in connection with code optimization. FIG. 4B illustrates the description of each mnemonic.

The mapping of functional units to instruction types determines which instructions can be executed in parallel, and therefore whether a fetch packet will become more than one execute packet. For example, if only the M unit can perform a multiply (MPY), an execute packet could have two MPY instructions, one to be executed by each of the two datapaths 11d and 11e. In contrast, the L, S, and D units are all capable of executing an add (ADD), thus an execute packet could contain as many as six ADD instructions.

Referring again to FIG. 3, the instruction's operand field follows the opfield. Depending on the instruction type, the operand field may identify one or more source registers, one or more constants, and a destination register.

FIG. 5 is an example of code having multiple execute packets per fetch packet 20. In this example, there are two fetch packets 20. The first fetch packet 20 is executed in three execute packets, EP1, EP2, and EP3. The second fetch packet 20 is executed in four execute packets, EP1, EP2, EP3, and EP4.

To generalize the above-described processor architecture, an executable instruction word, i.e., an execute packet, contains up to eight instructions to be executed in parallel during a CPU cycle. Each instruction in an execute packet uses a different one of the functional units (L, D, S or M) of datapaths 11d and 11e. The instruction mapping determines which instruction types can be duplicated within an execute packet.

The use of instruction words in this manner lends itself to unique techniques for power optimization. As explained below, within an instruction word, instructions can be arranged so that, for each slot, changes from cycle to cycle are minimized.

Power Optimization with NOP Alignment and Execution Control

FIG. 6 illustrates a code optimization process in accordance with the invention. The process is explained below, together with an example of code optimization in accordance with that process. The code example is consistent with the architecture of processor 10 as described above in connection with FIGS. 1–5. Specifically, the examples are consistent with a processor 10 that uses fetch packets that may be divided into execute packets, and special considerations for this distinction between fetch packets and execute packets are noted.

However, the invention is equally useful for processors whose fetch packets are the same as the execute packets, as well as for processors that do not use "packets" in the conventional sense. The common characteristic of the code to be optimized is that it has "multiple-instruction words". The term "multiple-instruction word" is used to signify a set of instructions, where the instructions within the set are grouped at some point within the processor for processing (which may include fetching, dispatching, decoding, executing, or some combination of these functions), and where the executing is by different functional units of the processor. The "multiple-instruction word" may be structured as a fetch packet, or as an execute packet, or it may have a structure different from a conventional packet structure.

U.S. patent application Ser. No. 60/068656, entitled "Power Reduction for Multiple-Instruction-Word Processors by Modification of Instruction Words", is directed to a number of techniques for finding and minimizing cycle-to-cycle bit changes in the binary representation of the assembly code. Each technique is directed to finding and minimizing a different category of bit changes. In a general sense, the code is scanned for various syntax features as opposed to functional features. Various syntax changes can be made without substantially affecting the overall functionality in terms of the number and type of instructions. Because there are fewer bit changes and the functionality is substantially the same, the result is less node switching when instructions are fetched from program memory and when they are decoded and dispatched. This in turn, reduces power dissipation.

One optimization technique is re-arranging NOP (no operation) instructions so as to provide a smoother code profile. More specifically, this technique determines whether there are NOPs that can be moved from one fetch packet to another without affecting the functionality of the code. If NOP instructions are moved from one packet to another, non-NOP instructions may also be moved such that overall functionality of code is not changed for the particular set of packets.

FIGS. 6A and 6B illustrate an example of unoptimized code and the corresponding optimized code, respectively. The code has eight fetch packets, FP1 . . . FP8. The shaded slots contain instructions that are not NOP instructions. As illustrated in the example of FIG. 6B, a number of NOP instructions have been moved from one fetch packet to another. Because a NOP instruction is all 0's, their placement has a significant effect on the number of bits changing from cycle to cycle.

The above-described optimization technique could be performed manually by an assembly code programmer. However, in more sophisticated embodiments of the invention, one or more of the techniques are performed automatically, with a code generation tool. Such a tool would be programmed to detect code sequences in which a particular technique is applicable and to perform the optimization called for by that technique.

Typically, for processor 10, each program fetch automatically results in an access of eight instructions in program memory. However, once NOPs are aligned, the program memory block associated with a slot having all NOPs would not need to be accessed during this section of code.

FIG. 7 illustrates a special control bit 71, which may be used to further reduce power savings when executing code having NOPs aligned as described above. Specifically, control registers 11f of processor 10 could include a "slot access control bit" 71, which could be set at the beginning of a section of code having a series of aligned NOPs. Control logic 11g include slot access logic circuitry 72, which disables strobes to the block of memory associated with a slot having a series of NOPs. During execution of the section of code, control bit 71 could be cleared. A reset or other type of interrupt could be used to clear control bit 71. Where the section of code is part of a loop, depending on loop size and number of passes through the loop, the cycle count could be in the thousands with a commensurate savings in power.

Although the above description is in terms of fetch packets having multiple execute packets, control bit 71 is also useful for a multi-cycle loop having only a single execute packet per fetch packet. In general, the control bit 71 may be used to disable memory access in any case where, for a specified number of cycles, a series of fetch packets contain at least one NOP instruction in the same slot.

Other Embodiments

Although the present invention has been described in detail, it should be understood that various changes, substitutions, and alterations can be made hereto without departing from the spirit and scope of the invention as defined by the appended claims.

What is claimed is:

1. A method of reducing power usage by a processor that processes multiple-instruction words, said words having corresponding slots, one slot for each instruction in a word, said words being processed during one or more processor cycles, comprising the steps of:

comparing the syntax of a series of two or more of said words;

determining whether, from cycle to cycle, one or more NOP instructions can be moved to the same slot without substantially affecting functionality of said instruction words;

modifying at least one of said words in accordance with said determining step; and disabling access to memory that stores instructions for said slot during fetch cycles for said series of instructions.

2. The method of claim 1, wherein said determining step determines whether a NOP instruction can be moved to another slot in the same word.

3. The method of claim 1, wherein said determining step determines whether a NOP instruction can be moved to another slot in a different word.

4. The method of claim 1, wherein said disabling step is accomplished by setting a control bit of said processor.

5. The method of claim 1, wherein said disabling step is accomplished by disabling memory strobing.

6. The method of claim 1, wherein said processor is a very long instruction word processor.

7. The method of claim 1, wherein said processor is a dual datapath processor.

8. The method of claim 1, wherein said multiple instruction words are fetch packets, such that all instructions in said instruction words are fetched from memory at substantially the same time.

9. The method of claim 1, wherein said processor executes multiple execute packets per fetch packet, such that one execute packet is executed per cycle.

10. The method of claim 1, wherein said processor executes a single execute packet per fetch packet, such that one fetch packet is executed per cycle.

11. A improved multiple-instruction word processor, said processor operable to execute words having corresponding slots, one slot for each instruction in the word, the improvement comprising:

a control bit operable to disable access to program memory associated with a slot of multiple-instruction words executed by said processor; and means for clearing said control bit.

12. The processor of claim 11, wherein said control bit is set in response to a signal representing the beginning of a section of program code having a series of NOP instructions in the same slot.

13. The processor of claim 11, wherein said processor is a VLIW processor that executes multiple packets from the same fetch packet.

14. The processor of claim 11, wherein said processor is a VLIW processor that executes a single packet per fetch packet.

15. The processor of claim 11, wherein said processor is a dual-datapath processor.

16. The processor of claim 11, further comprising logic circuitry in communication with said control bit for disabling strobes to memory that stores instructions in said slot.

* * * * *